US012062842B2

(12) United States Patent
Yosui et al.

(10) Patent No.: US 12,062,842 B2
(45) Date of Patent: Aug. 13, 2024

(54) ANTENNA ELEMENT AND ELECTRONIC DEVICE

(71) Applicant: Murata Manufacturing Co., Ltd., Nagaokakyo (JP)

(72) Inventors: Kris Yosui, Smyrna, GA (US); Daiki Kobayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 265 days.

(21) Appl. No.: 17/696,396

(22) Filed: Mar. 16, 2022

(65) Prior Publication Data

US 2022/0209413 A1 Jun. 30, 2022

Related U.S. Application Data

(63) Continuation of application No. PCT/JP2020/036701, filed on Sep. 28, 2020.

(30) Foreign Application Priority Data

Sep. 30, 2019 (JP) ................................ 2019-179240

(51) Int. Cl.
*H01Q 1/38* (2006.01)
*H01Q 1/52* (2006.01)
*H01Q 9/04* (2006.01)

(52) U.S. Cl.
CPC ............... *H01Q 1/38* (2013.01); *H01Q 1/523* (2013.01); *H01Q 9/0421* (2013.01)

(58) Field of Classification Search
CPC .......... H01Q 1/38; H01Q 1/421; H01Q 1/523; H01Q 9/0421
See application file for complete search history.

(56) References Cited

U.S. PATENT DOCUMENTS

| | | | |
|---|---|---|---|
| 2002/0044099 | A1 | 4/2002 | Yamamoto et al. |
| 2003/0189521 | A1 | 10/2003 | Yamamoto et al. |
| 2010/0225560 | A1 | 9/2010 | Endou |

(Continued)

FOREIGN PATENT DOCUMENTS

| | | | |
|---|---|---|---|
| JP | 2002-050923 | A | 2/2002 |
| JP | 2004-007532 | A | 1/2004 |
| JP | 2010-206739 | A | 9/2010 |

(Continued)

OTHER PUBLICATIONS

Official Communication issued in International Patent Application No. PCT/JP2020/036701, mailed on Dec. 15, 2020.

*Primary Examiner* — Robert Karacsony
(74) *Attorney, Agent, or Firm* — Keating & Bennett, LLP

(57) ABSTRACT

An antenna element includes a base including laminated insulating layers, a radiation conductor on a principal surface of the base, an insulator at least a portion of which is on a surface of the radiation conductor, and an interlayer connection conductor in at least one of the insulating layers and connected to the radiation conductor, wherein a connection region of the surface of the radiation conductor overlapping the interlayer connection conductor protrudes relative to an outer edge of the radiation conductor in a lamination direction in which the insulating layers are laminated, and the insulator does not overlap the connection region and at least sandwiches the connection region when viewed in the lamination direction of the insulating layers.

20 Claims, 13 Drawing Sheets

(56) References Cited

U.S. PATENT DOCUMENTS

| | | | |
|---|---|---|---|
| 2017/0279191 | A1 | 9/2017 | Yosui et al. |
| 2019/0252781 | A1 | 8/2019 | Isayama et al. |

FOREIGN PATENT DOCUMENTS

| | | | |
|---|---|---|---|
| JP | 2012-195423 | A | 10/2012 |
| WO | 2016/181782 | A1 | 11/2016 |
| WO | 2018/180072 | A1 | 10/2018 |

ANTENNA ELEMENT AND ELECTRONIC DEVICE

CROSS REFERENCE TO RELATED APPLICATIONS

This application claims the benefit of priority to Japanese Patent Application No. 2019-179240 filed on Sep. 30, 2019 and is a Continuation Application of PCT Application No. PCT/JP2020/036701 filed on Sep. 28, 2020. The entire contents of each application are hereby incorporated herein by reference.

BACKGROUND OF THE INVENTION

1. Field of the Invention

The present invention relates to an antenna element including a base including a plurality of laminated insulating layers and a radiation conductor on the base, and further relates to an electronic device including the antenna element.

2. Description of the Related Art

An antenna element including a base, a radiation conductor formed on a principal surface of the base, and an insulating member formed on a surface of the radiation conductor is known.

For example, Japanese Unexamined Patent Application Publication No. 2010-206739 discloses an antenna element in which the insulating member with a lower dielectric constant than the base is formed on the surface of the radiation conductor.

However, when the insulating member is formed in a shape covering the entire surface of the radiation conductor as in Japanese Unexamined Patent Application Publication No. 2010-206739, a thickness of the entire antenna element is uniformly increased. In particular, when the base is a multilayer body formed by hot-pressing a plurality of insulating layers and an interlayer connection conductor is formed in at least one of the insulating layers, a protrusion is likely to be formed in a region of the principal surface of the base obtained after laminating the insulating layers where the interlayer connection conductor is formed, and it is difficult to form a thin antenna element.

SUMMARY OF THE INVENTION

Preferred embodiment of the present invention provide thin antenna elements each including an insulator on a surface of a radiation conductor, and electronic devices each including such an antenna element.

An antenna element according to a preferred embodiment of the present invention includes a base including a plurality of laminated insulating layers, a radiation conductor on a principal surface of the base, an insulator at least a portion of which is on a surface of the radiation conductor, and an interlayer connection conductor in at least one of the plurality of insulating layers and connected to the radiation conductor, wherein a connection region of the surface of the radiation conductor overlapping the interlayer connection conductor, protrudes relative to an outer edge of the radiation conductor in a lamination direction in which the plurality of insulating layers are laminated, and the insulator is located such that the insulator does not overlap the connection region and sandwiches the connection region when viewed in the lamination direction of the insulating layers.

With the features described above, a thickness of the antenna element (thickness in the lamination direction) is able to be less than that when an insulator covering the entire surface of the radiation conductor is provided.

An electronic device according to a preferred embodiment of the present invention includes a housing and an antenna element in the housing, the antenna element including a base including a plurality of laminated insulating layers, a radiation conductor on a principal surface of the base, a first insulator at least a portion of which is on a surface of the radiation conductor, and an interlayer connection conductor in at least one of the insulating layers and connected to the radiation conductor, wherein a connection region of the surface of the radiation conductor overlapping the interlayer connection conductor protrudes relative to an outer edge of the radiation conductor in a lamination direction in which the insulating layers are laminated, and the first insulator is located such that the first insulator does not overlap the connection region and sandwiches the connection region when viewed in the lamination direction of the insulating layers.

With the features described above, the electronic device including the thin antenna element is able to be obtained even when the antenna element has a configuration including the first insulator on the surface of the radiation conductor of the antenna element.

Preferred embodiments of the present invention are each able to obtain a thin antenna element in a configuration including an insulator on the surface of the radiation conductor, and an electronic device including such an antenna element.

The above and other elements, features, steps, characteristics and advantages of the present invention will become more apparent from the following detailed description of the preferred embodiments with reference to the attached drawings.

DEATILED DESCRIPTION OF THE PREFERRED EMBODIMENTS

Figure 1A:
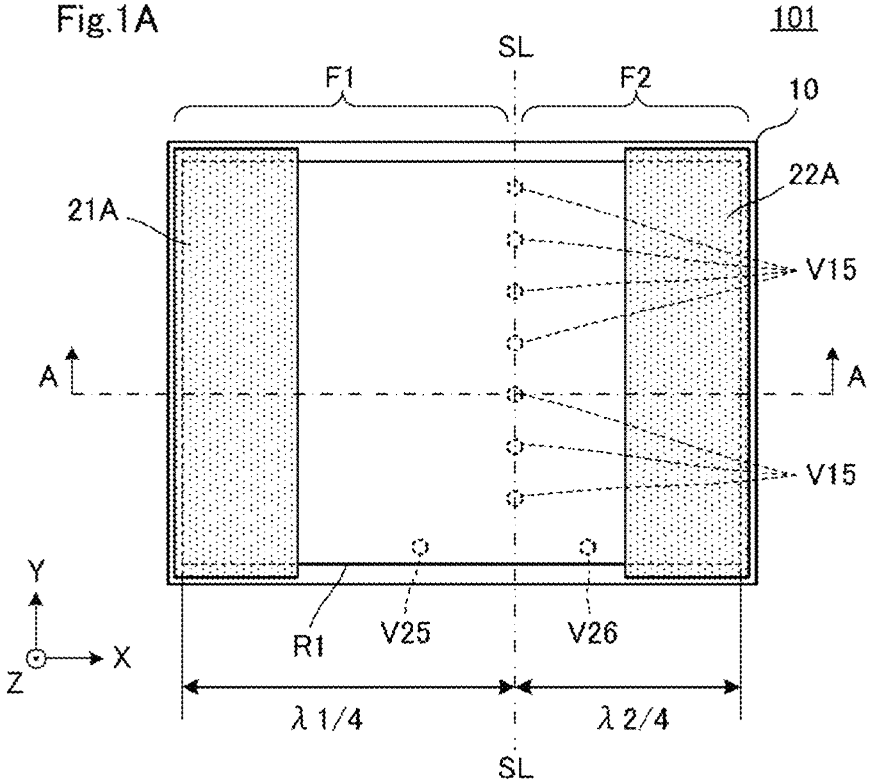
FIG. 1A is a plan view of an antenna element 101 according to a first preferred embodiment of the present invention.

Preferred embodiments of the present invention will be described below in connection with several examples and referring to the drawings. The same or corresponding components and locations in the drawings are denoted by the same reference signs. Although the preferred embodiments are separately described for the sake of convenience in consideration of ease in explanation and understanding of important points, features explained in the different preferred embodiments can be partially replaced or combined with each other. In the second and subsequent preferred embodiments, description of common matters to those in the first preferred embodiment is omitted, and only different points are described. Particularly, similar operations and advantageous effects obtained with similar features are not repeatedly described in each of the preferred embodiments.

First Preferred Embodiment

Figure 1B:
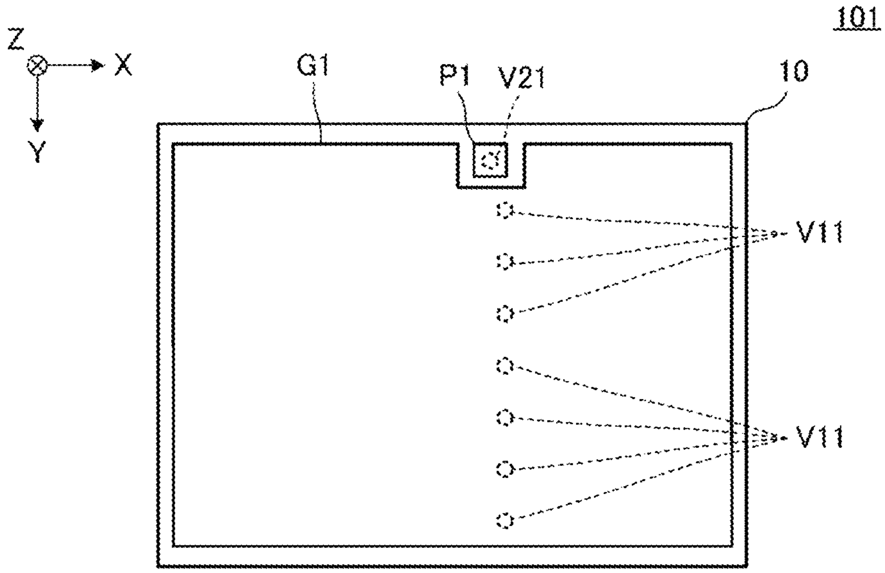
FIG. 1B is a bottom view of the antenna element 101.
Figure 2:
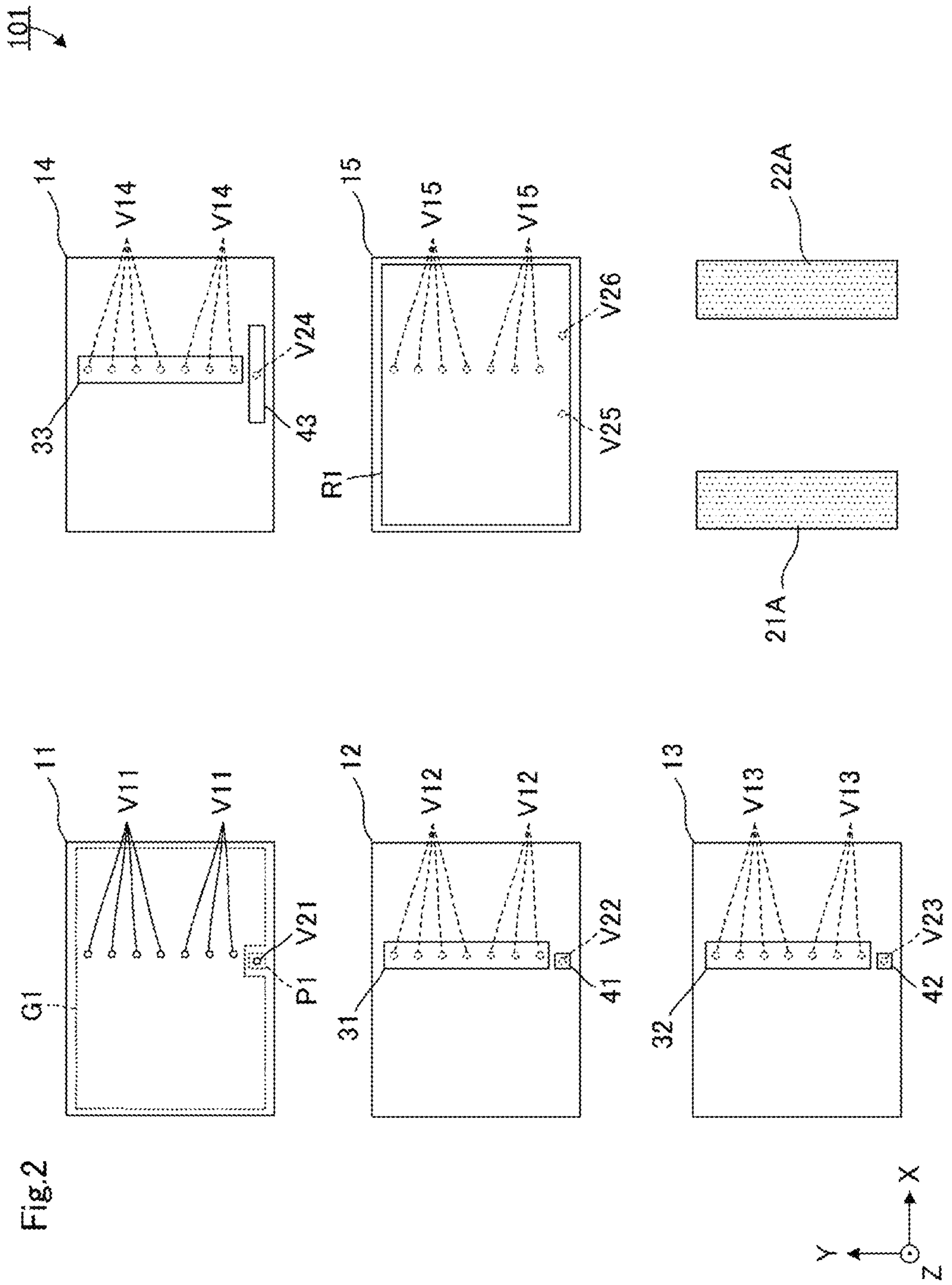
FIG. 2 is an exploded plan view of the antenna element 101.
Figure 3:
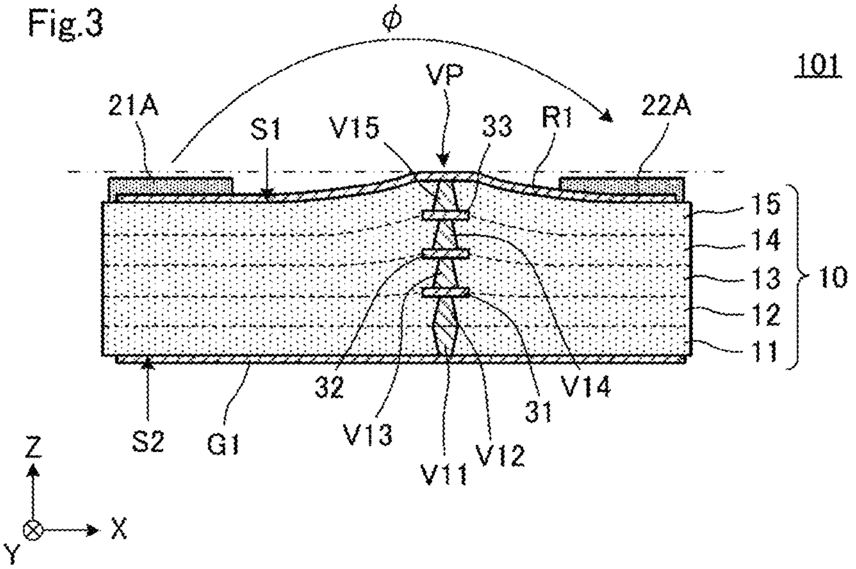
FIG. 3 is a sectional view taken along A-A in FIG. 1A.

FIG. 1A is a plan view of an antenna element 101 according to a first preferred embodiment of the present invention. FIG. 1B is a bottom view of the antenna element 101. FIG. 2 is an exploded plan view of the antenna element 101. FIG. 3 is a sectional view taken along A-A in FIG. 1A. In FIGS. 1A and 2, first insulating members 21A and 22A are illustrated in dot patterns for easier understanding of structure. In FIG. 3, thicknesses of individual portions are illustrated in an exaggerated manner. This point is similarly applied to other sectional views described later.

The antenna element 101 includes a base 10, conductor patterns (a radiation conductor R1, a ground conductor G1, an outer electrode P1, and conductors 31, 32, 33, 41, 42 and 43), an interlayer connection conductor (a plurality of first interlayer connection conductors V11, V12, V13, V14 and V15 and a plurality of second interlayer connection conductors V21, V22, V23, V24, V25 and V26), the first insulating members 21A and 22A, and so on.

The base 10 is a rectangular or substantially rectangular insulating flat plate of which a lengthwise direction is aligned with an X-axis direction. The base 10 includes a first principal surface S1 and a second principal surface S2 that are opposite to each other. The radiation conductor R1 is provided on the first principal surface S1 of the base 10. The ground conductor G1 and the outer electrode P1 are provided on the second principal surface S2 of the base 10. The first insulating members 21A and 22A are each provided over a region spanning from the first principal surface S1 of the base 10 to a surface of the radiation conductor R1. The conductors 31 to 33 and 41 to 43 and the interlayer connection conductors are provided inside the base 10.

The base 10 is formed by laminating insulating layers 11, 12, 13, 14 and 15 in this order and then hot-pressing those layers together. The first principal surface S1 and the second principal surface S2 of the base 10 are surfaces perpendicular or substantially perpendicular to a lamination direction (Z-axis direction) in which the insulating layer 11, 12, 13, 14 and 15 are laminated. The insulating layers 11 to 15 are each a rectangular or substantially rectangular flat sheet of which a lengthwise direction is aligned with the X-axis direction. The insulating layers 11 to 15 each have flexibility. The insulating layers 11 to 15 are each made of, for example, a sheet including thermoplastic resin as a main ingredient (for example, a sheet containing a liquid crystal polymer (LCP), polyetheretherketone (PEEK), or the like as a main ingredient).

The outer electrode P1 and the ground conductor G1 are provided on a rear surface of the insulating layer 11. The outer electrode P1 is a rectangular or substantially rectangular conductor pattern that is located near a center of a first side of the insulating layer 11 (namely, a lower side of the insulating layer 11 in FIG. 2). The ground conductor G1 is a conductor pattern that is provided over the entire or substantially the entire surface of the insulating layer 11. The outer electrode P1 and the ground conductor G1 are conductor patterns made of Cu foils, for example.

A plurality of the first interlayer connection conductors V11 and the second interlayer connection conductor V21 are provided in the insulating layer 11. As illustrated in FIG. 2, the first interlayer connection conductors V11 are arrayed in a first direction (Y-axis direction).

The conductors 31 and 41 are provided on a surface of the insulating layer 12. The conductor 31 is a rectangular or substantially rectangular conductor pattern that is located near a center of the insulating layer 12. A lengthwise direction of the conductor 31 is aligned with the Y-axis direction. The conductor 41 is a rectangular or substantially rectangular conductor pattern that is located near a center of a first side of the insulating layer 12 (namely, a lower side of the insulating layer 12 in FIG. 2). The conductors 31 and 41 are conductor patterns made of Cu foils, for example.

A plurality of the first interlayer connection conductors V12 and the second interlayer connection conductor V22 are provided in the insulating layer 12. As illustrated in FIG. 2, the first interlayer connection conductors V12 are arrayed in the first direction (Y-axis direction).

The conductors 32 and 42 are provided on a surface of the insulating layer 13. The conductor 32 is a rectangular or substantially rectangular conductor pattern that is located near a center of the insulating layer 13. A lengthwise direction of the conductor 32 is aligned with the Y-axis direction. The conductor 42 is a rectangular or substantially rectangular conductor pattern that is located near a center of a first side of the insulating layer 13 (namely, a lower side of the insulating layer 13 in FIG. 2). The conductors 32 and 42 are conductor patterns made of Cu foils, for example.

A plurality of the first interlayer connection conductors V13 and the second interlayer connection conductor V23 are provided in the insulating layer 13. As illustrated in FIG. 2, the first interlayer connection conductors V13 are arrayed in the first direction (Y-axis direction).

The conductors 33 and 43 are provided on a surface of the insulating layer 14. The conductor 33 is a rectangular or substantially rectangular conductor pattern that is located near a center of the insulating layer 14. A lengthwise direction of the conductor 33 is aligned with the Y-axis direction. The conductor 43 is a rectangular or substantially rectangular conductor pattern that is located near a center of a first side of the insulating layer 14 (namely, a lower side of the insulating layer 14 in FIG. 2). A lengthwise direction of the conductor 43 is aligned with the X-axis direction. The conductors 33 and 43 are conductor patterns made of Cu foils, for example.

A plurality of the first interlayer connection conductors V14 and the second interlayer connection conductor V24 are provided in the insulating layer 14. As illustrated in FIG. 2, the first interlayer connection conductors V14 are arrayed in the first direction (Y-axis direction).

The radiation conductor R1 is provided on a surface of the insulating layer 15. The radiation conductor R1 is a rectangular or substantially rectangular conductor pattern that is provided over the entire or substantially the entire surface of the insulating layer 15. A lengthwise direction of the radiation conductor R1 is aligned with the X-axis direction. The radiation conductor R1 is a conductor pattern made of a Cu foil, for example.

A plurality of the first interlayer connection conductors V15 and the second interlayer connection conductors V25 and V26 are provided in the insulating layer 15. As illustrated in FIG. 2, the first interlayer connection conductors V15 are arrayed in the first direction (Y-axis direction). The second interlayer connection conductors V25 and V26 are arrayed in a second direction (X-axis direction).

The first insulating members 21A and 22A are each a rectangular or substantially rectangular member (in a plan view) that spans over the surface (the first principal surface S1) of the insulating layer 15 and the surface of the radiation conductor R1. A lengthwise direction of each of the first insulating members 21A and 22A is aligned with the Y-axis direction. A relative dielectric constant (εr1) of each of the first insulating members 21A and 22A is higher than that (εr0) of the base 10 (εr1>εr0). For example, the relative dielectric constant (εr1) of the first insulating members 21A and 22A is about 3.3, and the relative dielectric constant (εr0) of the base 10 is about 3.0. The first insulating members 21A and 22A are each, for example, a solder resist film, a coverlay film, an epoxy resin film, or a polyimide film.

The first insulating member 21A is located near a second side of the first principal surface (namely, a left side of the base 10 in FIG. 1A). The first insulating member 21A covers a portion of an outer edge of the radiation conductor R1. In other words, the first insulating member 21A covers a left side, a portion of an upper side, and a portion of a lower side of the radiation conductor R1 in FIG. 1A. The first insulating member 22A is located near a fourth side of the first principal surface (namely, a right side of the base 10 in FIG. 1A). The first insulating member 22A covers a portion of the outer edge of the radiation conductor R1. In other words, the first insulating member 22A covers a right side, a portion of the upper side, and a portion of the lower side of the radiation conductor R1 in FIG. 1A.

As illustrated in FIGS. 2 and 3, the radiation conductor R1 is electrically connected to the ground conductor G1. In more detail, the radiation conductor R1 is connected to the conductor via the first interlayer connection conductor V15. The conductor 33 is connected to the conductor 32 via the first interlayer connection conductor V14. The conductor 32 is connected to the conductor 31 via the first interlayer connection conductor V13. Furthermore, the conductor 31 is connected to the ground conductor G1 via the first interlayer connection conductors V11 and V12.

The radiation conductor R1 is further electrically connected to the outer electrode P1. In more detail, the radiation conductor R1 is connected to the conductor 43 via the second interlayer connection conductors V25 and V26. The conductor 43 is connected to the conductor 42 via the second interlayer connection conductor V24. The conductor 42 is connected to the conductor 41 via the second interlayer connection conductor V23. Furthermore, the conductor 41 is connected to the outer electrode P1 via the second interlayer connection conductors V21 and V22.

When the base is formed by laminating a plurality of insulating layers on which conductor patterns are provided, a thickness of the conductor patterns is added to that of a portion of the base in which the conductor patterns are provided. Accordingly, the thickness of the portion in the lamination direction (Z-axis direction) in which the conductor patterns are provided becomes greater than that of the other portion. On the principal surface of the base, therefore, a protrusion is likely to be provided as a portion protruding from the principal surface. The protrusion includes a location where the interlayer connection conductor is provided. With the formation of the protrusion, a shape of the first principal surface of the base becomes different from that of the second principal surface. More specifically, on the principal surface in which the radiation conductor is provided, the protrusion protrudes relative to an outer edge in the lamination direction. Thus, a portion of the principal surface in which the radiation conductor is provided protrudes by an amount corresponding to a height of the protrusion in the lamination direction. Particularly, when an interlayer connection conductor harder than the insulating layer exists at the time of the hot pressing, the protrusion with a larger size is likely to be provided in a region of the principal surface of the base where the interlayer connection conductor is located when viewed in the lamination direction. Furthermore, when a plurality of the interlayer connection conductors are connected in series in the Z-axis direction as illustrated in FIG. 3, thicker portions in which the conductor patterns are provided are laid one above another in multiple layers. In such a case, therefore, a protrusion with a larger size is likely to be provided in a region of the principal surface of the base where the interlayer connection conductors are located when viewed in the lamination direction. Thus, as illustrated in FIG. 3, in the antenna element 101 according to the present preferred embodiment, a connection region VP of the surface of the radiation conductor R1 overlapping the interlayer connection conductors (the first interlayer connection conductors V11 to V15 or the second interlayer connection conductors V21 to V26) when viewed in the Z-axis direction protrudes relative to the outer edge of the radiation conductor R1.

In the present preferred embodiment, the first insulating members 21A and 22A are located at positions not overlapping the connection region VP and sandwiching the connection region VP in one direction (for example, the X-axis direction) when viewed in the Z-axis direction. Furthermore, in the present preferred embodiment, surface heights of the first insulating members 21A and 22A (namely, heights from the second principal surface S2 to surfaces of the first insulating members 21A and 22A in the Z-axis direction) are lower than a surface height of the connection region VP (namely, a height from the second principal surface S2 to a surface of the connection region VP in the Z-axis direction).

As illustrated in FIG. 1A, the radiation conductor R1 of the antenna element 101 is roughly separated (divided) into a first region F1 (left portion) and a second region F2 (right portion) when viewed in the Z-axis direction by a straight line SL passing the first interlayer connection conductors V15 that are arrayed in the first direction (for example, the Y-axis direction). In other words, the straight line SL is a straight line passing on a plane parallel to an XY-plane defined by the X-axis direction and the Y-axis direction (namely, a plane perpendicular to the Z-axis direction). Moreover, a length of the first region F1 in the second direction perpendicular or substantially perpendicular to the first direction (namely, in the X-axis direction) is about λ1/4 (λ1 denoting the wavelength of a resonant frequency f1). A length of the second region F2 in the second direction is about λ2/4 (λ2 denoting the wavelength of a resonant frequency f2).

Figure 4:
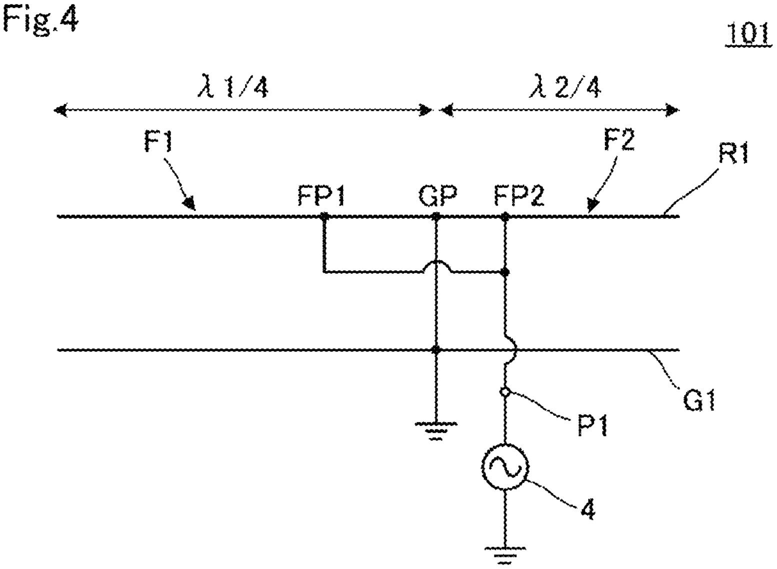
FIG. 4 is a circuit diagram of the antenna element 101 according to the first preferred embodiment of the present invention.

FIG. 4 is a circuit diagram of the antenna element 101 according to the first preferred embodiment. As illustrated in FIG. 4, the outer electrode P1 is connected to a power feed circuit 4, and the ground conductor G1 is connected to a ground. Here, the power feed circuit 4 is connected to a predetermined position (feed point FP1) in the first region F1. Accordingly, the first region F1 defines and functions as a plate-shaped inverted-F antenna (PIFA) with the resonant frequency f1. The power feed circuit 4 is further connected to a predetermined position (feed point FP2) in the second region F2. Accordingly, the second region F2 defines and functions as a plate-shaped inverted-F antenna (PIFA) with the resonant frequency f2. Thus, the first region F1 and the second region F2 of the radiation conductor R1 act as two antennas with the different resonant frequencies.

The following advantageous effects can be obtained with the antenna element 101 according to the present preferred embodiment.

(a) According to the present preferred embodiment, the first insulating members 21A and 22A do not overlap the connection region VP protruding relative to the other portion of the radiation conductor R1. In addition, the first insulating members 21A and 22A are located at the positions sandwiching the connection region VP. With this arrangement, the thickness of the antenna element (thickness in the lamination direction) can be reduced in comparison with that when the first insulating member covers the entire surface of the radiation conductor.

(b) According to the present preferred embodiment, the first insulating members 21A and 22A cover a portion of the outer edge of the radiation conductor R1. In the radiation conductor R1, the outer edge is a portion in which the intensity of an electromagnetic field is relatively high. Therefore, radiation efficiency of the antenna element is further increased by covering at least portions of the outer edge of the radiation conductor R1 with the first insulating members 21A and 22A. With the connection region VP having the protruding shape, the outer edge (end portion) of the radiation conductor R1 is likely to peel off. Due to the above-described configuration, however, the outer edge of the radiation conductor R1 is reinforced by the first insulating members 21A and 22A. As a result, the radiation conductor R1 is reduced or prevented from peeling off at the outer edge. From the viewpoint of increasing the radiation efficiency of the antenna element and reducing or preventing the peeling-off of the outer edge of the radiation conductor R1, it is preferable to cover the entire or substantially the entire outer edge of the radiation conductor R1 with the first insulating member.

In the case of, as in the antenna element 101 according to the present preferred embodiment, including the rectangular or substantially rectangular radiation conductor R1 of which a lengthwise direction is aligned with the second direction (X-axis direction) and providing the structure in which the first interlayer connection conductors V15 connected to the ground are arrayed in the first direction (Y-axis direction), a voltage amplitude at each of the second and fourth sides of the radiation conductor R1 facing in the second direction, is larger than that at each of the first and third sides thereof. In other words, a voltage amplitude at each of the left and right sides of the radiation conductor R1 in FIG. 1A is larger than that at each of the lower and upper sides of the radiation conductor R1 in FIG. 1A. Therefore, when the second and fourth sides of the radiation conductor R1 are covered with the first insulating members 21A and 22A as in the present preferred embodiment, the radiation efficiency of the antenna element is increased in comparison with that when the first and third sides of the radiation conductor R1 are covered with the first insulating members. Thus, when a portion of the outer edge of the radiation conductor R1 is covered with the first insulating member, the radiation efficiency of the antenna element can be more efficiently increased by covering the portion in which the voltage amplitude is relatively large.

(c) According to the present preferred embodiment, the radiation conductor R1 is roughly separated (divided) into the first region F1 and the second region F2 with respect to the first interlayer connection conductors V15 that are arrayed in the first direction. In this case, the first region F1 and the second region F2 define and function as two antennas with the different resonant frequencies. As described above, in the surface of the radiation conductor R1, the connection region VP overlapping the interlayer connection conductors when viewed in the Z-axis direction protrudes relative to the outer edge (the other portion) of the radiation conductor R1. Thus, isolation between the first region F1 and the second region F2 can be ensured by the protruding connection region VP of the radiation conductor R1. As a result, mutual interference between the first region F1 and the second region F2 defining and functioning as two antennas with the different resonant frequencies can be reduced or prevented.

The antenna element 101 according to the present preferred embodiment is manufactured through the following steps, for example.

(1) First, the insulating layers 11, 12, 13, 14 and 15 are prepared. The insulating layers 11 to 15 are each formed of a sheet including, as a main ingredient, thermoplastic resin, for example, a liquid crystal polymer (LCP) or polyetheretherketone (PEEK).

(2) Next, the conductor patterns are formed in the insulating layers 11 to 15. In more detail, a metal foil (for example, a Cu foil) is laminated on one surface of each of the insulating layers 11 to 15. Then, the laminated metal foil is subjected to patterning by lithography, for example. With the patterning, the ground conductor G1 and the outer electrode P1 are formed on the rear surface of the insulating layer 11. Then, the conductors 31 and 41 are formed on the surface of the insulating layer 12. Then, the conductors 32 and 42 are formed on the surface of the insulating layer 13. Then, the conductors 33 and 43 are formed on the surface of the insulating layer 14. Then, the radiation conductor R1 is formed on the surface of the insulating layer 15.

(3) The first interlayer connection conductors V11, V12, V13, V14 and V15 and the second interlayer connection conductors V21, V22, V23, V24, V25 and V26 are formed in the insulating layers 11 to 15. In forming the interlayer connection conductors, holes (through-holes) are first formed in each of the insulating layers 11 to 15. Then, a conductive paste including metal powder of, for example, Cu, Sn, or an alloy of any of the metals and a resin material is provided (filled) into the holes. Thereafter, the conductive paste is solidified by hot pressing. Thus, the solidified conductive paste is disposed in the insulating layers 11 to 15.

(4) Next, the insulating layers 11, 12, 13, 14 and 15 are laminated (stacked) in this order. The laminated insulating layers 11 to 15 are then hot-pressed (by one-time pressing). The base 10 is thus formed. At this time, in the surface of the radiation conductor R1, the connection region VP overlapping the interlayer connection conductors when viewed in the lamination direction (Z-axis direction) protrudes relative to the outer edge (the other portion) of the radiation conductor R1.

(5) Thereafter, the first insulating members 21A and 22A are formed on the surface of the radiation conductor R1 and the first principal surface S1 of the base 10. The first insulating members 21A and 22A are arranged at the positions not overlapping the connection region VP and at least sandwiching the interlayer connection conductors when viewed in the Z-axis direction. The first insulating members 21A and 22A are each formed of, for example, a solder resist film, a coverlay film, an epoxy resin film, or a polyimide film.

According to the above-described non-limiting example of a manufacturing method, the base 10 can be easily formed by laminating the insulating layers 11 to 15 each including the thermoplastic resin as a main material, and by hot-pressing the laminated insulating layers (by one-time pressing). Therefore, the number of manufacturing steps can be reduced, and the cost can be maintained low.

Furthermore, according to the above-described manufacturing method, after providing the conductive paste in the holes formed in the insulating layers 11 to 15, the conductive paste is solidified by the hot pressing (one-time pressing). Therefore, the number of steps of forming the interlayer connection conductors can be reduced.

Figure 5:
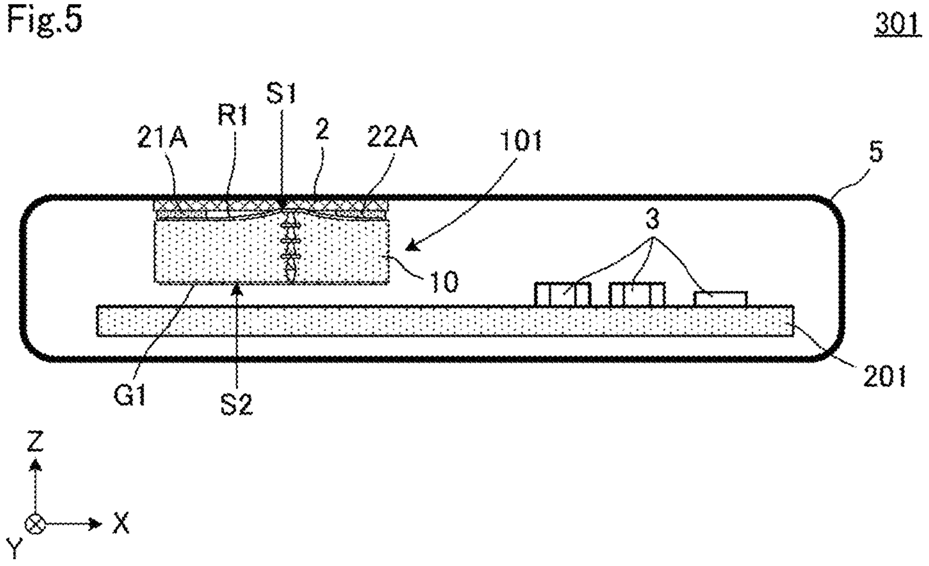
FIG. 5 is a sectional view of an electronic device 301 according to the first preferred embodiment of the present invention.

The antenna element 101 is used, for example, as follows. FIG. 5 is a sectional view of an electronic device 301 according to the first preferred embodiment.

The electronic device 301 includes the antenna element 101, a housing 5, a circuit board 201, a second insulating member 2, a plurality of components 3, and so on. Although the electronic device 301 further includes other members than described above, the other members are omitted in FIG. 5. The circuit board 201 is, for example, a printed wiring board. The second insulating member 2 is, for example, a double-sided tape. The components 3 are, for example, chip components such as a chip inductor and a chip capacitor, an RFIC element, an impedance matching circuit, and a transmission line board.

The antenna element 101, the circuit board 201, and the components 3 are disposed inside the housing 5. The components 3 are mounted on a surface of the circuit board 201. The antenna element 101 is bonded at one side including the first principal surface S1 of the base 10 to an inner surface of the housing 5 with the second insulating member 2 interposed therebetween. The second insulating member 2 is in contact with the inner surface of the housing 5, the first insulating members 21A and 22A, and the connection region (see the connection region VP in FIG. 3).

In the present preferred embodiment, a relative dielectric constant (εr5) of the housing 5 is higher than a relative dielectric constant (εr1) of the first insulating members 21A and 22A. The relative dielectric constant (εr5) of the housing 5 is, for example, about 6.0. The housing 5 is made of, for example, glass or polycarbonate. A relative dielectric constant (εr2) of the second insulating member 2 is preferably not lower than the relative dielectric constant (εr1) of the first insulating members 21A and 22A.

With the above-described features, the electronic device 301 including the antenna element 101 that is thin and has high radiation efficiency can be obtained even when the antenna element has the structure that the first insulating members 21A and 22A are provided on the surface of the radiation conductor R1 of the antenna element.

When the antenna element is bonded in place inside the housing 5 with the aid of the second insulating member 2 as in the electronic device 301 according to the present preferred embodiment, there is a restriction from an available space inside the housing 5. Therefore, countermeasures such as, for example, reducing a thickness of the second insulating member 2 are needed in some cases. In contrast, according to a preferred embodiment of the present invention, since the thin antenna element can be obtained, the antenna element can be easily mounted inside the housing 5. Therefore, the advantageous effects of the present invention are more significant in the case of, when the space inside the housing of the electronic device is small, providing the antenna element inside the housing.

Although the present preferred embodiment represents the electronic device 301 in which the antenna element 101 is bonded to the inner surface of the housing 5, the present invention is not limited to that case. For example, the antenna element may be mounted on a circuit board disposed inside the housing 5.

The present preferred embodiment represents an example of the antenna element in which the surface heights of the first insulating members 21A and 22A are lower than the surface height of the connection region VP. However, the present invention is not limited to such an example because the surface heights of the first insulating members 21A and 22A just need to not be higher than the surface height of the connection region VP. Preferably, the surface heights of the first insulating members 21A and 22A are equal or substantially equal to the surface height of the connection region VP. When the surface heights of the first insulating members 21A and 22A are equal or substantially equal to the surface height of the connection region VP, this increases areas of the first insulating members 21A and 22A and the connection region VP where they are bonded to the second insulating member 2. Thus, bonding strength of the antenna element to the second insulating member 2 (and the inner surface of the housing 5) is increased.

According to the present preferred embodiment, the antenna element is bonded to the inner surface of the housing 5 with the second insulating member 2 interposed therebetween in such a state that the second insulating member 2 is opposed to (in contact with) the first insulating members 21A and 22A. Furthermore, the relative dielectric constant of the first insulating members 21A and 22A and the relative dielectric constant of the second insulating member 2 are lower than that of the housing 5. When dielectric constants of members in the path of an electromagnetic wave are irregular (in random order), the radiation efficiency of the antenna element is reduced. From the viewpoint of increasing the radiation efficiency, therefore, it is preferable that the dielectric constants of the members existing in the path of the electromagnetic wave rise (or lower) in a successive order in one direction. In other words, the dielectric constants of the members existing in the path of the electromagnetic wave preferably increase (or decrease) monotonously. Assuming, for example, that dielectric constants of members 1, 2 and 3 are denoted by ε1, ε2 and ε3, respectively, it is only required to satisfy relationship of ε1≥ε2≥ε3 (or ε1≤c2≤ε3). With the above-described features, the relative dielectric constant increases step by step in the order of the first insulating members 21A and 22A in contact with the radiation conductor R1, the second insulating member 2, and the housing 5. Therefore, the radiation efficiency of the antenna element is increased. In the present preferred embodiment, the dielectric constant of the first insulating members 21A and 22A is smaller than that of the housing 5. Accordingly, from the viewpoint of increasing the radiation efficiency, the relative dielectric constant of the second insulating member 2 is preferably higher than that of the first insulating members 21A and 22A and is preferably lower than that of the housing 5.

According to the present preferred embodiment, the relative dielectric constants of the first insulating members 21A and 22A and the second insulating member 2 are not lower than the relative dielectric constant of the base 10. With this feature, in the path of an electromagnetic wave passing the first insulating members 21A and 22A, the second insulating member 2, and the housing 5 in this order from the radiation conductor R1 via the base 10, the dielectric constant increases step by step. Therefore, the radiation efficiency of the antenna element is further increased.

Second Preferred Embodiment

A second preferred embodiment of the present invention is an example of the antenna element in which the shape of the first insulating member and the number of the first interlayer connection conductors are different from those in the first preferred embodiment.

Figure 6A:
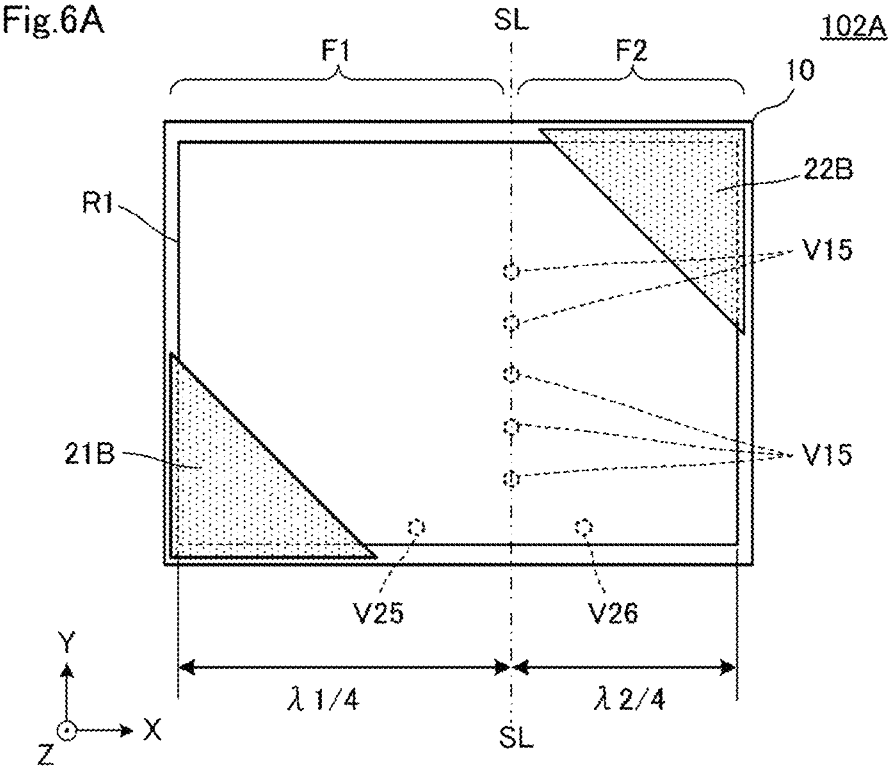
FIG. 6A is a plan view of an antenna element 102A according to a second preferred embodiment of the present invention.
Figure 6B:
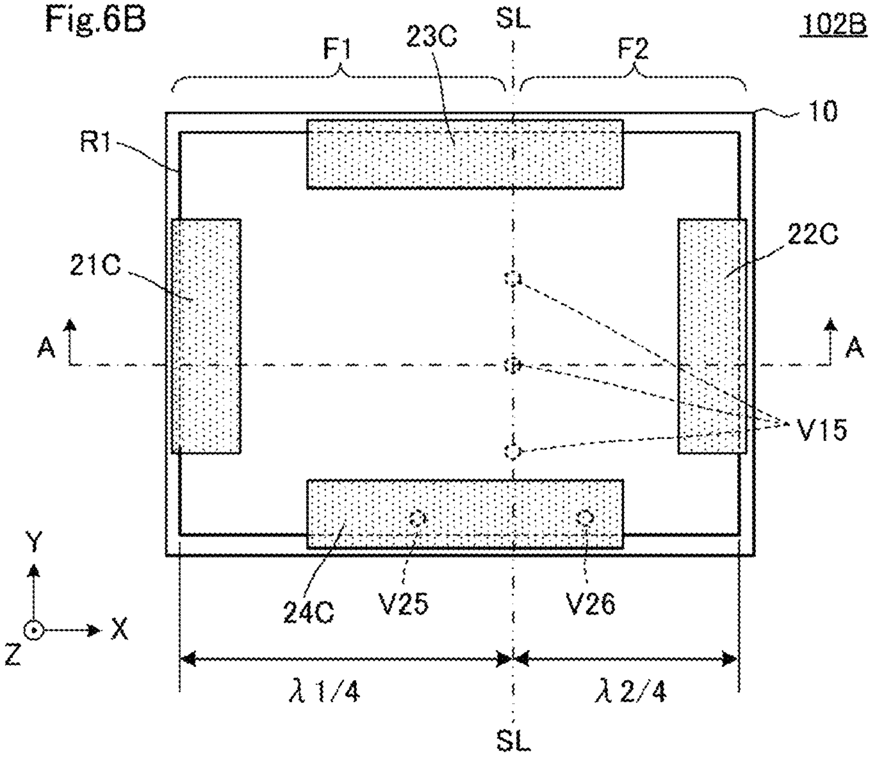
FIG. 6B is a plan view of another antenna element 102B according to the second preferred embodiment of the present invention.
Figure 7A:
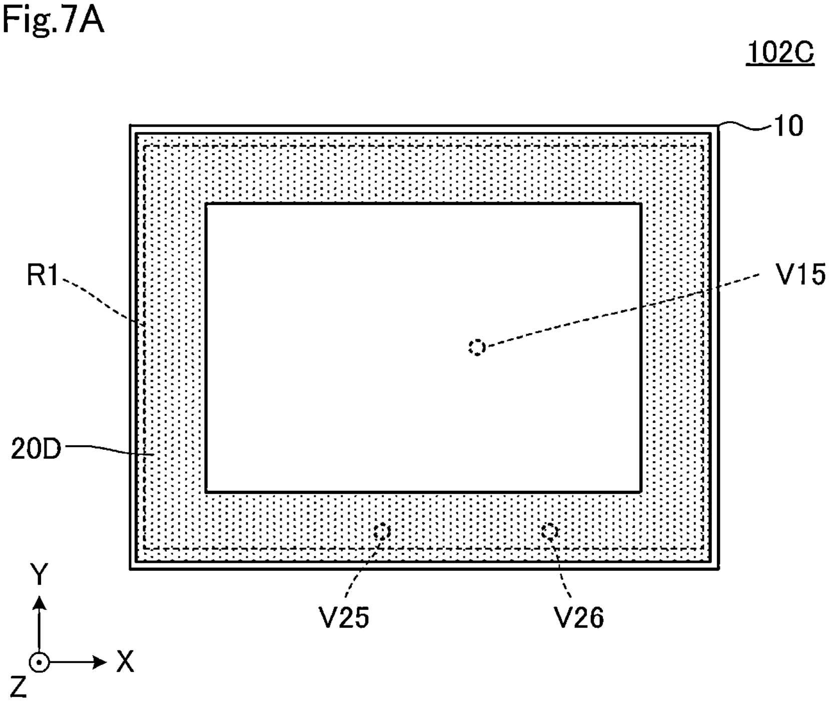
FIG. 7A is a plan view of another antenna element 102C according to the second preferred embodiment of the present invention.
Figure 7B:
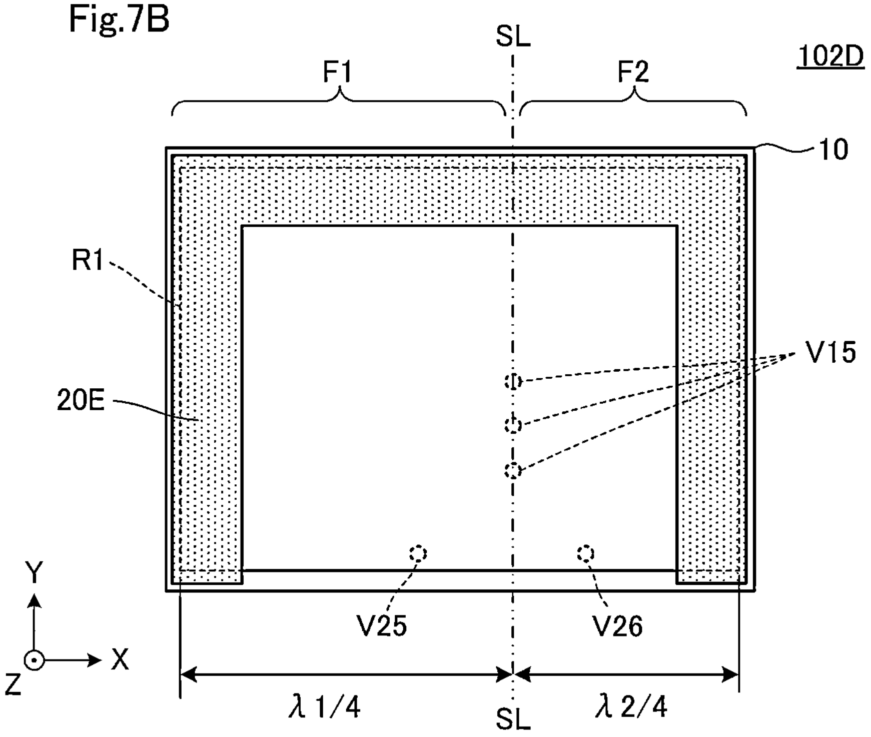
FIG. 7B is a plan view of another antenna element 102D according to the second preferred embodiment of the present invention.

FIG. 6A is a plan view of an antenna element 102A according to the second preferred embodiment. FIG. 6B is a plan view of another antenna element 102B according to the second preferred embodiment. FIG. 7A is a plan view of another antenna element 102C according to the second preferred embodiment. FIG. 7B is a plan view of another antenna element 102D according to the second preferred embodiment. In FIGS. 6A, 6B and 7, for easy understanding of the structure, first insulating members 21B, 22B, 21C, 22C, 23C, 24C, 20D and 20E are denoted by dot patterns.

The antenna element 102A is different from the antenna element 101 according to the first preferred embodiment in that it includes the first insulating members 21B and 22B. Furthermore, the antenna element 102A is different from the antenna element 101 in that five first interlayer connection conductors V15 are arrayed in the first direction (Y-axis direction). The remaining configuration of the antenna element 102A is the same or substantially the same as in the antenna element 101.

The first insulating member 21B is located at or adjacent to a first corner of the first principal surface (namely, a lower left corner of the base 10 in FIG. 6A). The first insulating member 21B is a triangular or substantially triangular member in a plan view. The first insulating member 22B is at or adjacent to a third corner of the first principal surface (namely, an upper right corner of the base 10 in FIG. 6A). The first insulating member 22B is a triangular or substantially triangular member when viewed in plan. The first insulating members 21B and 22B are located at positions sandwiching the connection region (the first interlayer connection conductors V15) in one direction when viewed in the Z-axis direction.

The antenna element 102B is different from the antenna element 101 according to the first preferred embodiment in that it includes the first insulating members 21C, 22C, 23C and 24C. Furthermore, the antenna element 102B is different from the antenna element 101 in that three first interlayer connection conductors V15 are arrayed in the first direction. The remaining configuration of the antenna element 102B is the same or substantially the same as in the antenna element 101.

The first insulating members 21C, 22C, 23C and 24C are located at positions surrounding the connection region (the first interlayer connection conductors V15) when viewed in the Z-axis direction. Here, the wording "a state in which the first insulating members are located at positions surrounding the connection region" indicates the state in which the first insulating members are located at positions sandwiching the connection region in one direction (for example, the X-axis direction) when viewed in the Z-axis direction, and in which the first insulating members are arranged at positions sandwiching the connection region in the other direction (for example, the Y-axis direction) perpendicular or substantially perpendicular to the one direction when viewed in the Z-axis direction.

The antenna element 102C is different from the antenna element 101 according to the first preferred embodiment in that it includes the first insulating member 20D. Furthermore, the antenna element 102C is different from the antenna element 101 in that the number of the first interlayer connection conductors V15 is one. The remaining configuration of the antenna element 102C is the same or substantially the same as in the antenna element 101.

The first insulating member 20D has a ring shape in a plan view and extends along the outer edge of the first principal surface. The first insulating member 20D continuously surrounds a periphery of the connection region (the first interlayer connection conductor V15) when viewed in the Z-axis direction.

The antenna element 102D is different from the antenna element 101 according to the first preferred embodiment in that it includes the first insulating member 20E. Furthermore, the antenna element 102D is different from the antenna element 101 in that three first interlayer connection conductors V15 are arrayed in the first direction (Y-axis direction). The remaining configuration of the antenna element 102D is the same or substantially the same as in the antenna element 101.

The first insulating member 20E extends along the second, third, and fourth sides of the first principal surface (namely, the left, upper, and right sides of the base 10 in FIG. 7B). Furthermore, the first insulating member 20E has a U shape in a plan view. The first insulating member 20E sandwiches the connection region (the first interlayer connection conductors V15) in one direction (for example, the X-axis direction) when viewed in the Z-axis direction.

As described in the present preferred embodiment, the shape of the first insulating member in a plan view is not limited to a rectangle or substantially a rectangle and can be changed as appropriate. The shape of the first insulating member in a plan view may be, for example, polygonal, circular, elliptic, Y-shaped, T-shaped, arcuate, or crank-shaped. The number and layout of the first insulating members can also be changed as appropriate as long as the operation and the advantageous effects of the present invention are obtained. Moreover, as described in the present preferred embodiment, the number of the connection regions (the interlayer connection conductors) can also be changed as appropriate as long as the operation and the advantageous effects of the present invention are obtained, and it may be one, for example.

In the radiation conductor R1, the intensity of the electromagnetic field is a maximum at the outer edge. From the viewpoint of increasing the radiation efficiency of the antenna element, therefore, it is preferable that a large portion of the outer edge of the radiation conductor R1 is covered with the first insulating member. In particular, as in the antenna element 102C, the entire or substantially the entire outer edge of the radiation conductor R1 is preferably covered with the first insulating member 20D.

Third Preferred Embodiment

A third preferred embodiment of the present invention is an example of the antenna element in which the antenna element further includes an outer conductor on the first principal surface of the base on which the radiation conductor is provided.

Figure 8A:
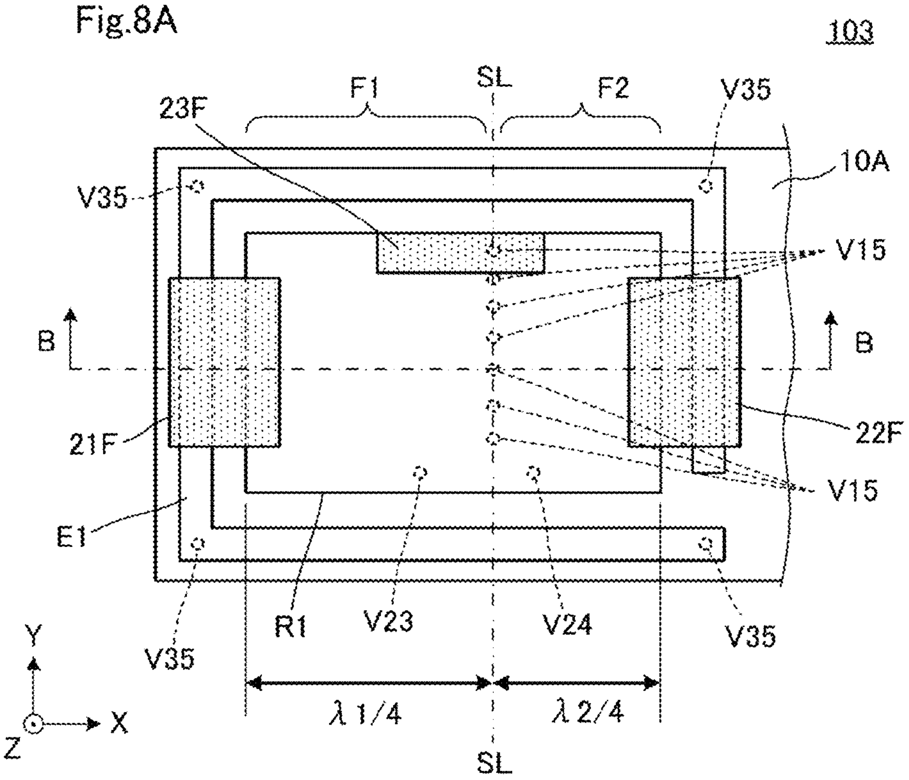
FIG. 8A is a plan view illustrating the vicinity of a first end (left end) of an antenna element 103 according to a third preferred embodiment of the present invention.
Figure 8B:
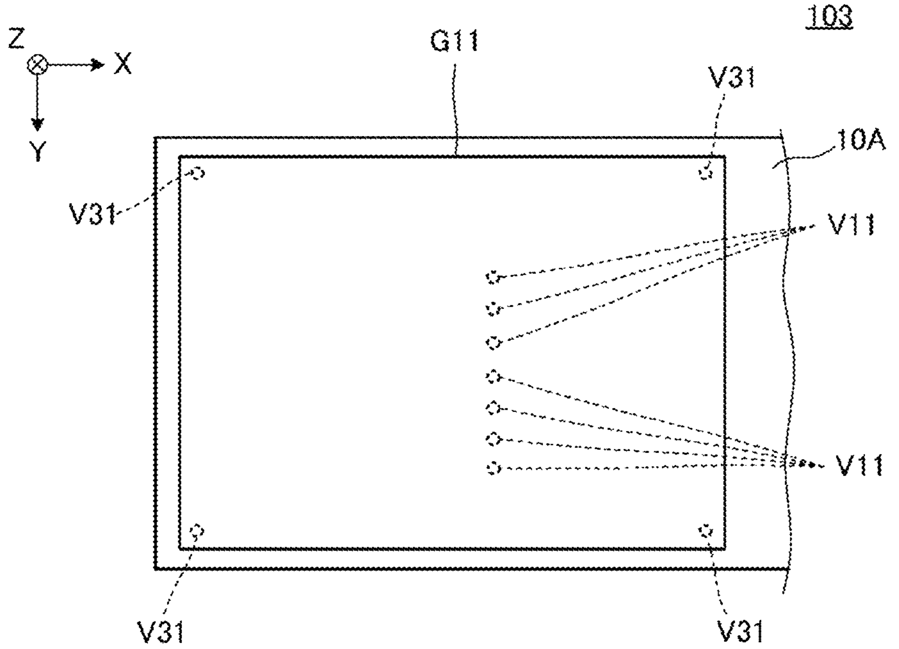
FIG. 8B is a bottom view of the vicinity of the first end of the antenna element 103.
Figure 9:
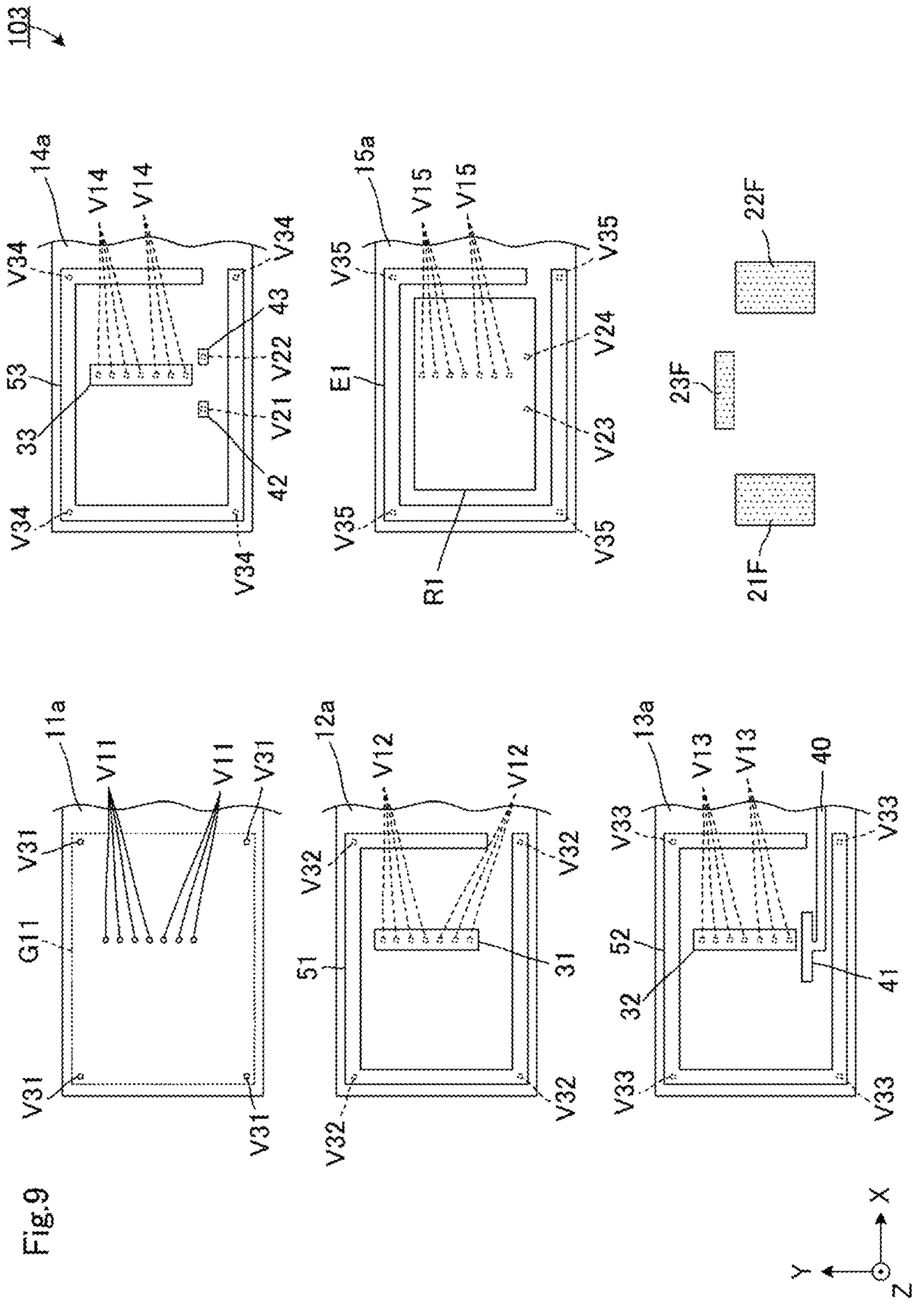
FIG. 9 is an exploded plan view of the vicinity of the first end of the antenna element 103.
Figure 10:
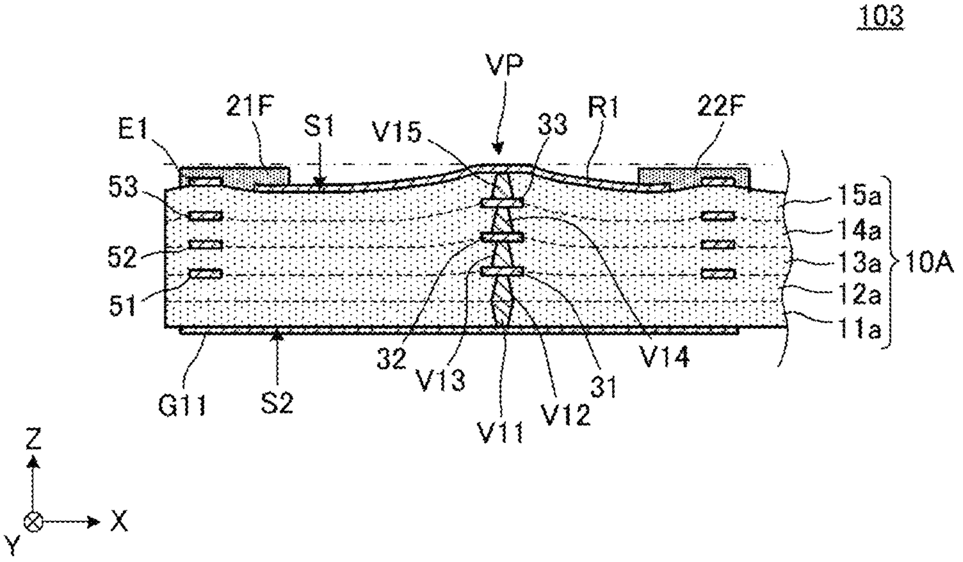
FIG. 10 is a sectional view taken along B-B in FIG. 8A.

FIG. 8A is a plan view illustrating the vicinity of a first end (left end) of an antenna element 103 according to the third preferred embodiment. FIG. 8B is a bottom view of the vicinity of the first end of the antenna element 103. FIG. 9 is an exploded plan view of the vicinity of the first end of the antenna element 103. FIG. 10 is a sectional view taken along B-B in FIG. 8A. In FIGS. 8A and 9, for easier understanding of structure, first insulating members 21F, 22F and 23F are denoted by dot patterns.

The antenna element 103 is different from the antenna element 101 according to the first preferred embodiment in that it includes a base 10A, three first insulating members 21F, 22F and 23F, and an outer conductor ε1. The remaining configuration of the antenna element 103 is the same or substantially the same as in the antenna element 101. Different points from the antenna element 101 according to the first preferred embodiment will be described below.

The base 10A is an elongate insulating flat plate of which length in a lengthwise direction (X-axis direction) is longer than that of the base 10 described in the first preferred embodiment. The base 10A is formed by laminating insulating layers 11*a*, 12*a*, 13*a*, 14*a* and 15*a* in this order and then hot-pressing the layers together. Lengths of the insulating layers 11*a* to 15*a* in a lengthwise direction are longer than those of the insulating layers 11 to 15 described in the first preferred embodiment.

A ground conductor G11 is provided on a rear surface of the insulating layer 11*a*. The ground conductor G11 is located near a first end of the insulating layer 11*a*. The ground conductor G11 is a rectangular or substantially rectangular conductor pattern. Furthermore, seven first interlayer connection conductors V11 and four third interlayer connection conductors V31 are provided in the insulating layer 11*a*. The seven first interlayer connection conductors V11 are arrayed in the first direction (Y-axis direction). The four third interlayer connection conductors V31 are provided in a one-to-one relationship adjacent to or in a vicinity of four corners of the ground conductor G11 that is rectangular or substantially rectangular in a plan view (namely, when viewed in the Z-axis direction).

Conductors 31 and 51 are provided on a surface of the insulating layer 12*a*. The conductor 31 is a rectangular or substantially rectangular conductor pattern of which a lengthwise direction is aligned with the Y-axis direction. The conductor 51 is located near a first end (left end) of the insulating layer 12*a* and surrounds the conductor 31. The conductor 51 is a rectangular or substantially rectangular loop-shaped conductor pattern. The conductor 51 is the conductor pattern made of a Cu foil, for example. Furthermore, seven first interlayer connection conductors V12 and four third interlayer connection conductors V32 are provided in the insulating layer 12*a*. The seven first interlayer connection conductors V12 are arrayed in the first direction (Y-axis direction). The four third interlayer connection conductors V32 are provided in a one-to-one relationship near four corners of the conductor 51 that has a rectangular or substantially rectangular outer shape in a plan view.

Conductors 32, 40, 41 and 52 are provided on a surface of the insulating layer 13*a*. The conductor 32 is a rectangular or substantially rectangular conductor pattern of which lengthwise direction is aligned with the Y-axis direction. The conductor 41 is a rectangular or substantially rectangular conductor pattern of which lengthwise direction is aligned with the X-axis direction. The conductor 40 is a linear or substantially linear conductor pattern extending in or substantially in the X-axis direction. The conductor 52 is located near a first end (left end) of the insulating layer 13*a* and surrounds the conductors 32 and 41. The conductor 52 is a rectangular or substantially rectangular loop-shaped conductor pattern. The conductors 40, 41 and 52 are conductor patterns made of Cu foils, for example. Furthermore, seven first interlayer connection conductors V13 and four third interlayer connection conductors V33 are provided in the insulating layer 13*a*. The seven first interlayer connection conductors V13 are arrayed in the first direction (Y-axis direction). The four third interlayer connection conductors V33 are provided in a one-to-one relationship near four corners of the conductor 52 that has a rectangular or substantially rectangular outer shape in a plan view.

Conductors 33, 42, 43 and 53 are provided on a surface of the insulating layer 14*a*. The conductor 33 is a rectangular or substantially rectangular conductor pattern of which lengthwise direction is aligned with the Y-axis direction. The conductors 42 and 43 are rectangular or substantially rectangular conductor patterns. The conductors 42 and 43 are arrayed in the X-axis direction in this order. The conductor 53 is located near a first end (left end) of the insulating layer 14*a* and surrounds the conductors 33, 42 and 43. The conductor 53 is a rectangular or substantially rectangular loop-shaped conductor pattern. The conductor 53 is a conductor pattern made of a Cu foil, for example. Furthermore, seven first interlayer connection conductors V14, second interlayer connection conductors V21 and V22, and four third interlayer connection conductors V34 are provided in the insulating layer 14*a*. The seven first interlayer connection conductors V14 are arrayed in the first direction (Y-axis direction). The second interlayer connection conductors V21 and V22 are arrayed in the second direction (X-axis direction) in this order. The four third interlayer connection conductors V34 are provided in a one-to-one relationship near four corners of the conductor 53 that has a rectangular or substantially rectangular outer shape in a plan view.

The radiation conductor R1 and the outer conductor ε1 are provided on a surface of the insulating layer 15*a* (namely, on the first principal surface S1). The radiation conductor R1 is a rectangular or substantially rectangular conductor pattern that is located near a first end (left end) of the insulating layer 15*a*. The outer conductor ε1 is located near the first end of the insulating layer 15*a* and surrounds the radiation conductor R1.

The outer conductor ε1 is a rectangular or substantially rectangular loop-shaped conductor pattern. The outer conductor ε1 is the conductor pattern made of a Cu foil, for example. Furthermore, seven first interlayer connection conductors V15, second interlayer connection conductors V23 and V24, and four third interlayer connection conductors V35 are provided in the insulating layer 15*a*. The seven first interlayer connection conductors V15 are arrayed in the first direction (Y-axis direction). The second interlayer connection conductors V23 and V24 are arrayed in the second direction (X-axis direction) in this order. The four third interlayer connection conductors V35 are provided in a one-to-one relationship near four corners of the outer conductor ε1 that has a rectangular or substantially rectangular outer shape in a plan view.

The first insulating member 21F and 22F are each a rectangular or substantially rectangular member (in a plan view) that spans over the surface of the insulating layer 15*a* (namely, the first principal surface S1), the surface of the radiation conductor R1, and a surface of the outer conductor ε1. A lengthwise direction of each of the first insulating members 21F and 22F are aligned with the Y-axis direction. The first insulating member 23F is a rectangular or substantially rectangular member (in a plan view) that is provided on the surface of the radiation conductor R1. A lengthwise direction of the first insulating members 23F is aligned with the X-axis direction.

The first insulating member 21F is located near the first side of the first principal surface (namely, a left side of the base 10A in FIG. 8A). The first insulating member 21F covers a portion of the outer edge of the radiation conductor R1 and a portion of the outer conductor ε1. The first insulating member 22F is located at a position closer to a second end of the base 10A (namely, a right side of the base 10A in FIG. 8A). The first insulating member 22F covers a portion of the outer edge of the radiation conductor R1 and a portion of the outer conductor ε1.

As illustrated in FIGS. 9 and 10, the radiation conductor R1 is electrically connected to the ground conductor G11. In more detail, the radiation conductor R1 is connected to the conductor 33 via the first interlayer connection conductor V15, and the conductor 33 is connected to the conductor 32 via the first interlayer connection conductor V14. The conductor 32 is connected to the conductor 31 via the first interlayer connection conductor V13, and the conductor 31 is connected to the ground conductor G1*l* via the first interlayer connection conductors V11 and V12.

The radiation conductor R1 is further electrically connected to the conductor 40. In more detail, one end of the conductor 40 is connected to the conductor 41. One end of the conductor 41 is connected to the radiation conductor R1 via the second interlayer connection conductors V21 and V23 and the conductor 42. Furthermore, the other end of the conductor 41 is connected to the radiation conductor R1 via the second interlayer connection conductors V22 and V24 and the conductor 43.

In addition, the outer conductor ε1 is electrically connected to the ground conductor G11. In more detail, the outer conductor ε1 is connected to the ground conductor G1*l* via the third interlayer connection conductors V31, V32, V33, V34 and V35 and the conductors 51, 52 and 53.

According to the present preferred embodiment, the outer conductor ε1 surrounds the radiation conductor R1. With this arrangement, radiation of an electromagnetic wave in a planar direction of the radiation conductor R1 (namely, in a direction parallel or substantially parallel to the X-axis direction and the Y-axis direction) is shielded. Particularly, in the present preferred embodiment, the outer conductor ε1, the ground conductor G11, and the conductors 51, 52 and 53 surround the radiation conductor R1 from the planar direction thereof and a −Z-axis direction. With this configuration, directivity of the antenna element can be controlled, and the radiation from the radiation conductor R1 in a +Z-axis direction is significantly increased.

According to the present preferred embodiment, the first insulating members 21F and 22F are located between the radiation conductor R1 and the outer conductor ε1 (connected to the ground) in the planar direction (namely, the direction parallel or substantially parallel to the first principal surface S1; for example, the X-axis direction). Thus, the first insulating members 21F and 22F are provided on the path of the electromagnetic wave passing between the outer conductor ε1 and the radiation conductor R1 from the radiation conductor R1 via the base 10. With this arrangement, the dielectric constants of the members existing on the path of the electromagnetic wave rise step by step in a successive order. Therefore, the radiation efficiency is increased in comparison with the case in which no first insulating members are provided between the radiation conductor R1 and the outer conductor ε1.

As described in the present preferred embodiment, the first insulating member may be provided only on the surface of the radiation conductor R1. From the viewpoint of increasing the radiation efficiency, however, the first insulating member preferably covers the outer edge of the radiation conductor R1.

Fourth Preferred Embodiment

A fourth preferred embodiment of the present invention is an example of the antenna element in which the radiation conductor is not directly connected to the ground conductor.

Figure 11A:
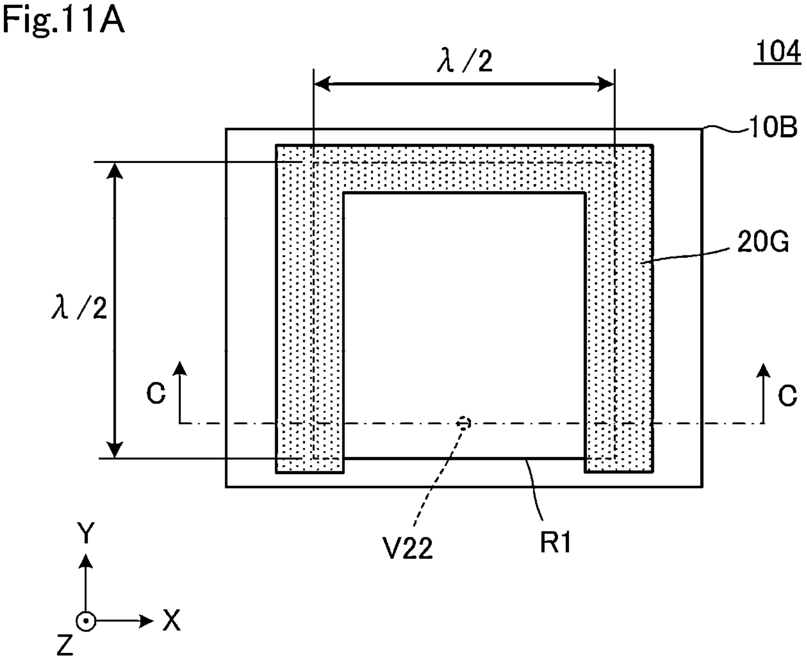
FIG. 11A is a plan view of an antenna element 104 according to a fourth preferred embodiment of the present invention.
Figure 11B:
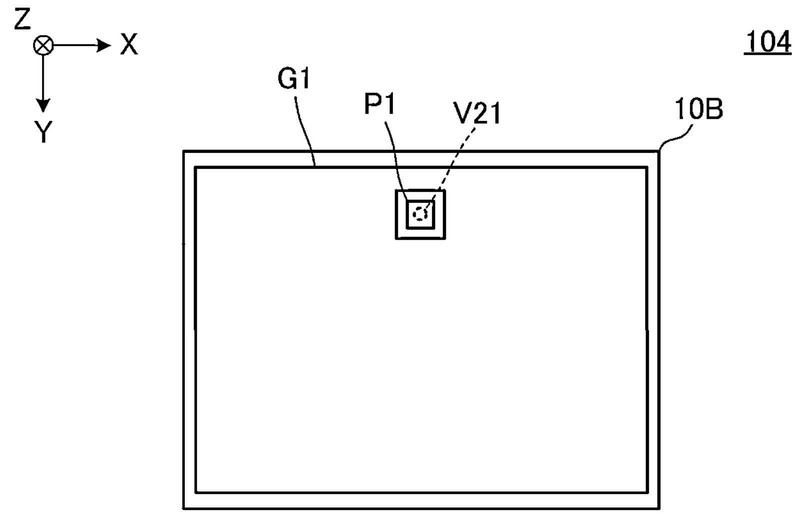
FIG. 11B is a bottom view of the antenna element 104.
Figure 12:
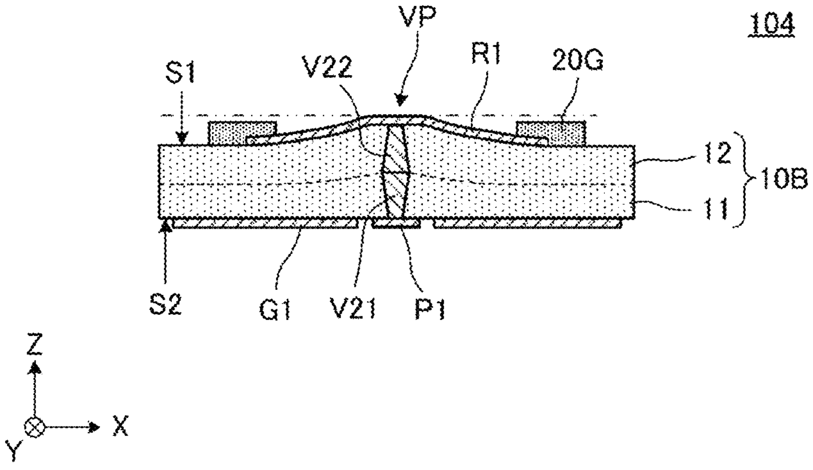
FIG. 12 is a sectional view taken along C-C in FIG. 11A.

FIG. 11A is a plan view of an antenna element 104 according to the fourth preferred embodiment, and FIG. 11B is a bottom view of the antenna element 104. FIG. 12 is a sectional view taken along C-C in FIG. 11A. In FIG. 11A, for easy understanding of structure, a first insulating member 20G is denoted by a dot pattern.

The antenna element 104 is different from the antenna element 101 according to the first preferred embodiment in that it includes a base 10B and one first insulating member 20G. The remaining configuration of the antenna element 104 is the same or substantially the same as in the antenna element 101. Different points from the antenna element 101 according to the first preferred embodiment will be described below.

The base 10B is different from the base 10 described in the first preferred embodiment in that the base 10B is formed by laminating insulating layers 11 and 12 in this order. The insulating layers 11 and 12 are the same or substantially the same as those described in the first preferred embodiment.

An outer electrode P1 and a ground conductor G1 are provided on a rear surface of the insulating layer 11. The outer electrode P1 is the same or substantially the same as that described in the first preferred embodiment. The ground conductor G1 is a rectangular or substantially rectangular conductor pattern that is provided over an entire or substantially an entire surface of the insulating layer 11. Moreover, a second interlayer connection conductors V21 is provided in the insulating layer 11.

A radiation conductor R1 is provided on a surface of the insulating layer 12. The radiation conductor R1 is the same or substantially the same as that described in the first preferred embodiment. Moreover, a second interlayer connection conductor V22 is provided in the insulating layer 12.

The first insulating member 20G is a U-shaped member that has a rectangular or substantially rectangular outer shape (in a plan view) and that is provided on the surface of the insulating layer 12 (namely, the first principal surface S1) and a surface of the radiation conductor R1. The first insulating member 20G is located along the second, third, and fourth sides of the first principal surface (namely, left, upper, and right sides of the base 10B in FIG. 11A). Furthermore, the first insulating member 20G covers a portion of the outer edge of the radiation conductor R1 (namely, left, upper, and right sides of the radiation conductor R1 in FIG. 11A).

As illustrated in FIG. 12, the radiation conductor R1 is electrically connected to the outer electrode P1. More specifically, the radiation conductor R1 is connected to the outer electrode P1 via the second interlayer connection conductors V21 and V22.

As illustrated in FIG. 11A, the radiation conductor R1 of the antenna element 104 has a length of about λ/2 (λ denoting the wavelength of the resonant frequency f1) in the first direction (for example, the Y-axis direction) when viewed in the Z-axis direction. Furthermore, the radiation conductor R1 of the antenna element 104 has a length of about λ/2 in the second direction (for example, the X-axis direction) perpendicular or substantially perpendicular to the first direction. Although omitted in the drawing, the outer electrode P1 is connected to a power feed circuit. The power feed circuit is connected to a predetermined position of the radiation conductor R1, such that the radiation conductor R1 acts as a patch antenna with the resonant frequency f1.

According to the present preferred embodiment, as with the antenna element 101 according to the first preferred embodiment, the thin antenna element with high radiation efficiency can also be obtained when the antenna element has the structure in which the first insulating member is provided on the surface of the radiation conductor.

Fifth Preferred Embodiment

A fifth preferred embodiment of the present invention is an example of the antenna element in which the radiation conductor defines and functions as one inverted-F antenna.

Figure 13A:
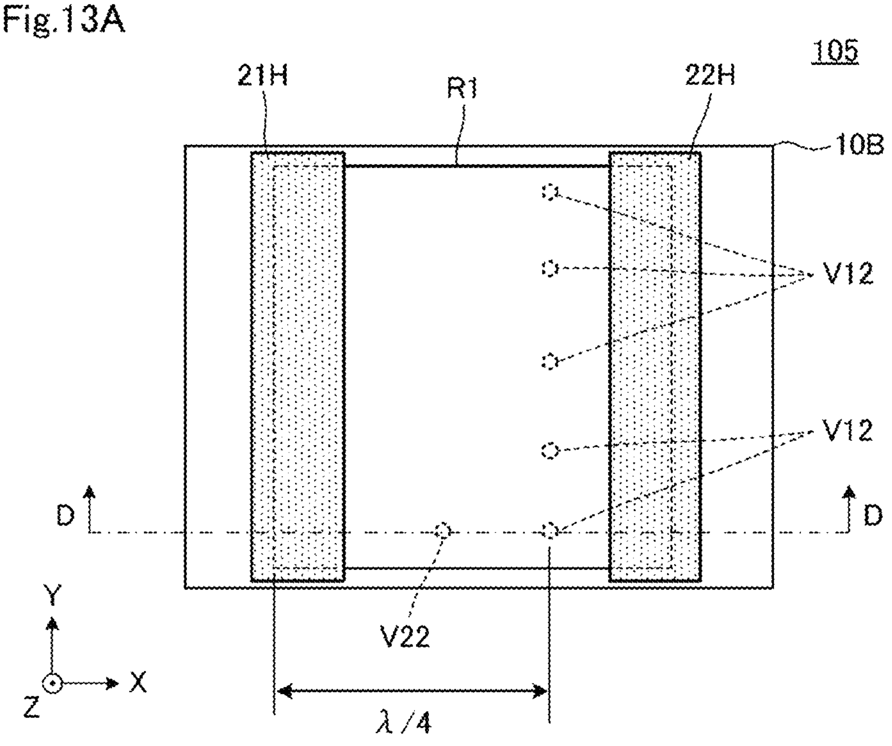
FIG. 13A is a plan view of an antenna element 105 according to a fifth preferred embodiment of the present invention.
Figure 13B:
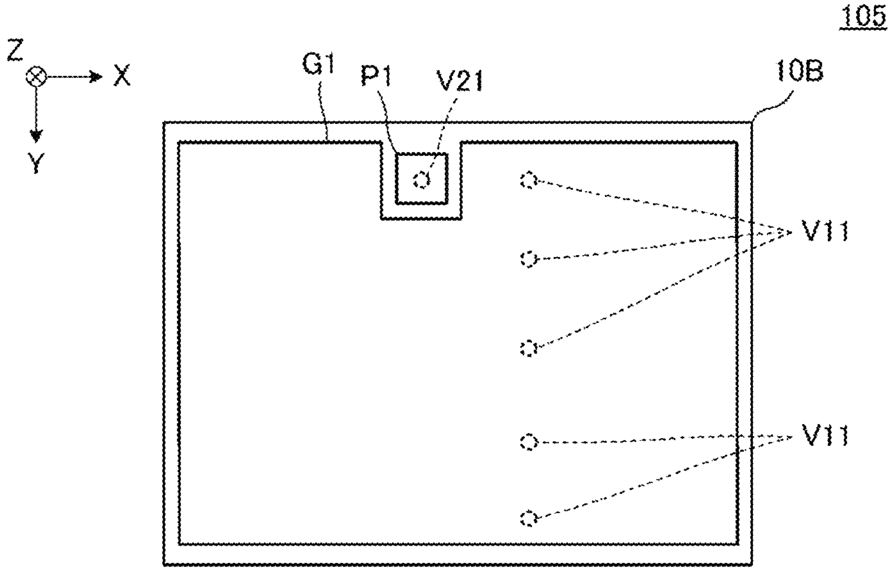
FIG. 13B is a bottom view of the antenna element 105.
Figure 14:
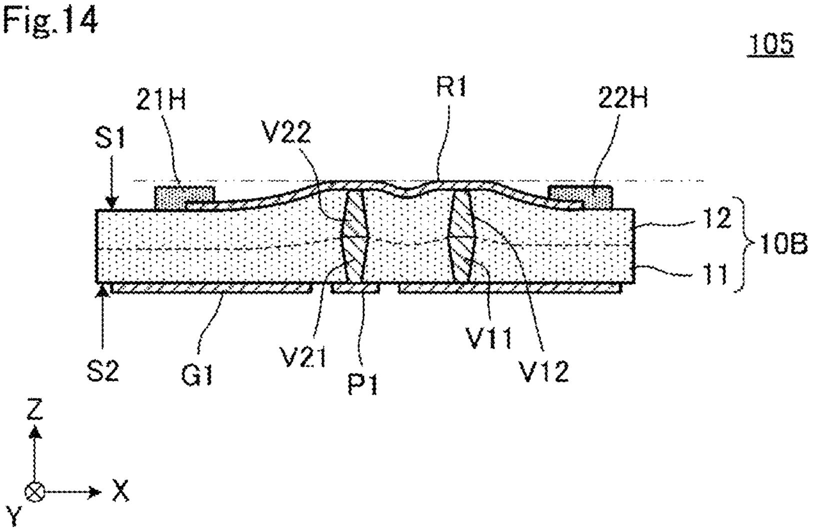
FIG. 14 is a sectional view taken along D-D in FIG. 13A.

FIG. 13A is a plan view of an antenna element 105 according to the fifth preferred embodiment, and FIG. 13B is a bottom view of the antenna element 105. FIG. 14 is a sectional view taken along D-D in FIG. 13A. In FIG. 13A, for easier understanding of structure, a first insulating member 21H, 22H is denoted by a dot pattern.

The antenna element 105 is different from the antenna element 101 according to the first preferred embodiment in that it includes a base 10B and the first insulating members 21H and 22H. The remaining configuration of the antenna element 105 is the same or substantially the same as in the antenna element 101. Different points from the antenna element 101 according to the first preferred embodiment will be described below.

The base 10B is formed, as with the base described in the fourth preferred embodiment, by laminating insulating layers 11 and 12 in the order mentioned.

An outer electrode P1 and a ground conductor G1 are provided on a rear surface of the insulating layer 11. The outer electrode P1 and the ground conductor G1 are the same or substantially the same as those described in the first preferred embodiment. Moreover, five first interlayer connection conductors V11 and a second interlayer connection conductor V21 are provided in the insulating layer 11. The five first interlayer connection conductors V11 are arrayed in the first direction (Y-axis direction).

A radiation conductor R1 is provided on a surface of the insulating layer 12. The radiation conductor R1 is the same or substantially the same as that described in the first preferred embodiment. Moreover, a second interlayer connection conductor V22 is provided in the insulating layer 12.

The first insulating members 21H and 22H are rectangular or substantially rectangular members (in a plan view) that are provided on the surface of the insulating layer 12 (namely, the first principal surface S1) and a surface of the radiation conductor R1. A lengthwise direction of each of the first insulating members 21H and 22H is aligned with the Y-axis direction. The first insulating member 21H is located near the second side of the first principal surface (namely, a left side of the base 10B in FIG. 13A). Furthermore, the first insulating member 21H covers a portion of the outer edge of the radiation conductor R1 (namely, a left side of the radiation conductor R1 in FIG. 13A). The first insulating member 22H is located near the fourth side of the first principal surface (namely, a right side of the base 10B in FIG. 13A). Furthermore, the first insulating member 22H covers a portion of the outer edge of the radiation conductor R1 (namely, a right side of the radiation conductor in FIG. 13A).

As illustrated in FIG. 14, the radiation conductor R1 is electrically connected to the ground conductor G1. More specifically, the radiation conductor R1 is connected to the ground conductor G1 via the first interlayer connection conductors V11 and V12. The radiation conductor R1 is further electrically connected to the outer electrode P1. More specifically, the radiation conductor R1 is connected to the outer electrode P1 via the second interlayer connection conductors V21 and V22.

As illustrated in FIG. 13A, in the antenna element 105, a length between the outer edge of the radiation conductor R1 and each of the first interlayer connection conductors V11 in the second direction (for example, the X-axis direction) when viewed in the Z-axis direction is about λ/4 (λ denoting the wavelength of a resonant frequency f). A power feed circuit (not illustrated) is connected to a predetermined position (feed point) of the radiation conductor R1, such that the radiation conductor R1 defines and functions as a plate-shaped inverted-F antenna (PIFA) with the resonant frequency f.

According to the present preferred embodiment, a thin antenna element with high radiation efficiency can also be obtained when the antenna element has the structure in which the first insulating member is provided on the surface of the radiation conductor.

Other Preferred Embodiments

The above-described preferred embodiments are examples in which the base is a rectangular or substantially rectangular flat plate of which lengthwise direction is the X-axis direction. However, the shape of the base is not limited to these examples and can be changed as appropriate as long as the operation and the advantageous effects of the present invention are obtained. The shape of the base in a plan view may be, for example, polygonal, circular, elliptic, L-shaped, U-shaped, T-shaped, Y-shaped, or crank-shaped.

The above-described preferred embodiments are examples in which the base is formed by laminating two or five insulating layers. However, the base is not limited to these examples. The number of the insulating layers of the base can be changed as appropriate and may be three, four, or six or more.

The above-described preferred embodiments are examples in which the base is formed by laminating the plurality of the insulating layers made of thermoplastic resin. However, the base is not limited to these examples. The base (the insulating layers) may be, for example, a composite multilayer body made of multiple types of resin. For example, the base (the insulating layers) may be formed by laminating a thermosetting resin layer and a thermoplastic resin layer, such as a glass/epoxy substrate. Furthermore, the above-described preferred embodiments are examples in which the dielectric constants of the members on the path of the electromagnetic wave rise in a successive order. From the viewpoint of increasing the radiation efficiency, however, the dielectric constants of the members on the path of the electromagnetic wave may also be selected to lower in a successive order.

Although the above-described preferred embodiments describe antenna elements in which the interlayer connection conductors are provided in all of the insulating layers of the base, the antenna element is not limited to this case. The interlayer connection conductors are not always required to be provided in all of the insulating layers of the base. The interlayer connection conductor only needs to be provided in at least one of the insulating layers of the base.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna element comprising:
- a base including a plurality of laminated insulating layers;
- a radiation conductor on a principal surface of the base;
- an insulator at least a portion of which is on a surface of the radiation conductor; and
- an interlayer connection conductor in at least one of the plurality of insulating layers and connected to the radiation conductor; wherein
- a connection region of the surface of the radiation conductor overlapping the interlayer connection conductor protrudes relative to an outer edge of the radiation conductor in a lamination direction in which the plurality of insulating layers are laminated; and
- the insulator does not overlap the connection region and sandwiches the connection region when viewed in the lamination direction of the insulating layers.

2. The antenna element according to claim 1, wherein the insulator covers at least a portion of the outer edge of the radiation conductor.

3. The antenna element according to claim 1, wherein the insulator surrounds the connection region when viewed in the lamination direction.

4. The antenna element according to claim 3, wherein the insulator continuously surrounds the connection region when viewed in the lamination direction.

5. The antenna element according to claim 1, further comprising:
- an outer conductor on the principal surface of the base; wherein
- the insulator is between the radiation conductor and the outer conductor in a planar direction parallel or substantially parallel to the principal surface.

6. The antenna element according to claim 1, further comprising:
- a ground conductor on the base; wherein
- the interlayer connection conductor includes a plurality of first interlayer connection conductors connected to the ground conductor and arrayed in a first direction;
- the radiation conductor is divided into a first region and a second region by a straight line passing through the plurality of first interlayer connection conductors when viewed in the lamination direction; and
- the first region and the second region define and function as antennas with different resonant frequencies.

7. An electronic device comprising:
- a housing; and
- an antenna element in the housing; wherein
- the antenna element includes:
  - a base including a plurality of laminated insulating layers;
  - a radiation conductor on a principal surface of the base;
  - a first insulator at least a portion of which is on a surface of the radiation conductor; and
  - an interlayer connection conductor in at least one of the plurality of insulating layers and connected to the radiation conductor; wherein
  - a connection region of the surface of the radiation conductor overlapping the interlayer connection conductor protrudes relative to an outer edge of the radiation conductor in a lamination direction in which the insulating layers are laminated; and
  - the first insulator does not overlap the connection region and sandwiches the connection region when viewed in the lamination direction of the insulating layers.

8. The electronic device according to claim 7, wherein
- the antenna element is bonded at a side including the principal surface of the base to an inner surface of the housing; and
- the first insulator has a lower dielectric constant than the housing.

9. The electronic device according to claim 8, wherein the first insulator has a higher dielectric constant than the base.

10. The electronic device according to claim 9, further comprising:
- a second insulator in contact with at least the inner surface of the housing and the first insulator; wherein
- the antenna element is bonded at the side including the principal surface of the base to the inner surface of the housing with the second insulator interposed therebetween; and
- the second insulator has a higher dielectric constant than the base and a lower dielectric constant than the housing.

11. The electronic device according to claim 7, wherein the insulator covers at least a portion of the outer edge of the radiation conductor.

12. The electronic device according to claim 7, wherein the insulator surrounds the connection region when viewed in the lamination direction.

13. The electronic device according to claim 12, wherein the insulator continuously surrounds the connection region when viewed in the lamination direction.

14. The electronic device according to claim 7, further comprising:
- an outer conductor on the principal surface of the base; wherein
- the insulator is between the radiation conductor and the outer conductor in a planar direction parallel or substantially parallel to the principal surface.

15. The electronic device according to claim 7, further comprising:
- a ground conductor on the base; wherein
- the interlayer connection conductor includes a plurality of first interlayer connection conductors connected to the ground conductor and arrayed in a first direction;
- the radiation conductor is divided into a first region and a second region by a straight line passing through the plurality of first interlayer connection conductors when viewed in the lamination direction; and
- the first region and the second region define and function as antennas with different resonant frequencies.

16. The antenna element according to claim 1, wherein each of the plurality of insulating layers include a thermoplastic resin as a main ingredient.

17. The antenna element according to claim 6, wherein each of the antennas define and function as a plate-shaped inverted-F antenna.

18. The antenna element according to claim 1, wherein the radiation conductor is a Cu foil.

19. The electronic device according to claim 7, wherein each of the plurality of insulating layers include a thermoplastic resin as a main ingredient.

20. The electronic device according to claim 15, wherein each of the antennas define and function as a plate-shaped inverted-F antenna.

* * * * *